Sept. 15, 1970 B. ZUK 3,529,294

INFORMATION SWITCHING AND STORAGE CIRCUITRY

Filed Oct. 2, 1967 2 Sheets-Sheet 1

INVENTOR
Borys Zuk

BY Robert R. Hubbard
ATTORNEY

INFORMATION SWITCHING AND STORAGE CIRCUITRY

Filed Oct. 2, 1967 2 Sheets-Sheet 2

INVENTOR
Borys Zuk

BY Robert R. Hubbard
ATTORNEY

United States Patent Office 3,529,294
Patented Sept. 15, 1970

3,529,294

INFORMATION SWITCHING AND STORAGE CIRCUITRY

Borys Zuk, Somerville, N.J., assignor to RCA Corporation, a corporation of Delaware Filed Oct. 2, 1967, Ser. No. 672,089
Int. Cl. H04q 9/00; H03k 3/26
U.S. Cl. 340—166 6 Claims

ABSTRACT OF THE DISCLOSURE

Information storage arrangements including a nonsaturating binary memory cell and emitter-coupled transistor read and write (R-W) circuits are described. The nonsaturating binary cell includes a common resistor for the collector circuits of a cross-coupled transistor pair. The R-W circuitry includes a pair of circuits each of which forms a current mode amplifier with one of the cross-coupled transistor pair.

BACKGROUND OF INVENTION

The present invention relates to information storage systems and in particular to binary memory elements employing transistors and to memories employing such binary elements. One of the more significant characteristics of a memory is its READ-WRITE cycle time, i.e., the time required to read information out of and write information into the memory. The switching speed of the binary memory element is a primary factor in the READ-WRITE cycle time.

Some known binary memory elements include a pair of cross-coupled transistors with each transistor being operable between saturation and cut-off. This type of operation is relatively slow due to the accumulation of minority carriers during the saturated state of a transistor. The depletion or discharge of the carriers requires time when the transistor is switched from the saturated to the cut-off state. Various diode clamping arrangements are known for avoiding the saturated condition and thereby enhancing the switching speed of the binary memory element. Most of these arrangements, although useful, are undesirable when it is desired to fabricate the memory by integrated circuit fabrication techniques, especially for large scale integration (LSI), since the clamping diode requires not only a separate isolation well but also necessitates a more complex wiring arrangement. As used herein, LSI technology refers to the manufacturing capability of fabricating more and more circuit components in or on the same chip or substrate whereby the electronic functional complexity on the chip approaches the system or subsystem level as distinguished from more elemental units such as logic gates, amplifiers, one or even a few binary elements (bits) of memory, and the like.

BRIEF SUMMARY OF INVENTION

According to one aspect of the invention, a nonsaturating flip-flop is provided. The flip-flop includes a pair of cross-coupled transistors with a collector resistor for each transistor. A common resistor element is connected to the ends of the collector resistors remote from the transistor collector electrodes. Circuit means is adapted to continuously pass a current through the common resistor and selectively through one or the other of the collector resistors according to the state of the flip-flop. The voltage drop across the common resistor is fed back to the turned-on one of the cross-coupled transistors to stabilize its conduction at a point short of saturation.

The nonsaturating flip-flop is useful as a binary memory cell in information storage systems. According to further aspects of the invention, each of the memory cell transistors has at least three emitter electrodes. One emitter electrode of each cell transistor is coupled to an X-select driver, while another emitter electrode of each cell transistor is coupled to a Y-select driver. The X and Y select drivers are adapted to provide paths for the memory cell current during non-selection of the cell. The read and write (R-W) circuitry for the cell includes DIGIT "1" and DIGIT "0" lines for coupling different ones of the third emitter electrodes of the cell transistors into separate current mode amplifier arrangements.

In a preferred embodiment, each current mode amplifier arrangement includes, in addition to the associated cell transistor, a write transistor and a read or sense transistor, all of which share a common current determining element such as a current source transistor.

BRIEF DESCRIPTION OF DRAWINGS

In the accompanying drawings like reference characters denote like components and.

DETAILED DESCRIPTION

The binary memory elements and associated read and write circuitry of the present invention may be constructed with transistors of any desired conductivity type semiconductor material which is generally employed to make transistors in the semiconductor art. However, by way of example and completeness of description, the transistors employed in the memory elements and associated read and write circuitry are illustrated as NPN types. Also, in the description which follows, all semiconductor material will be assumed (for the purpose of example) to be silicon, unless otherwise specified. Moreover, the memory elements and read and write circuits of the invention may be implemented either with discrete components or by means of integrated circuit processes.

MEMORY ORGANIZATION

Figure 1:
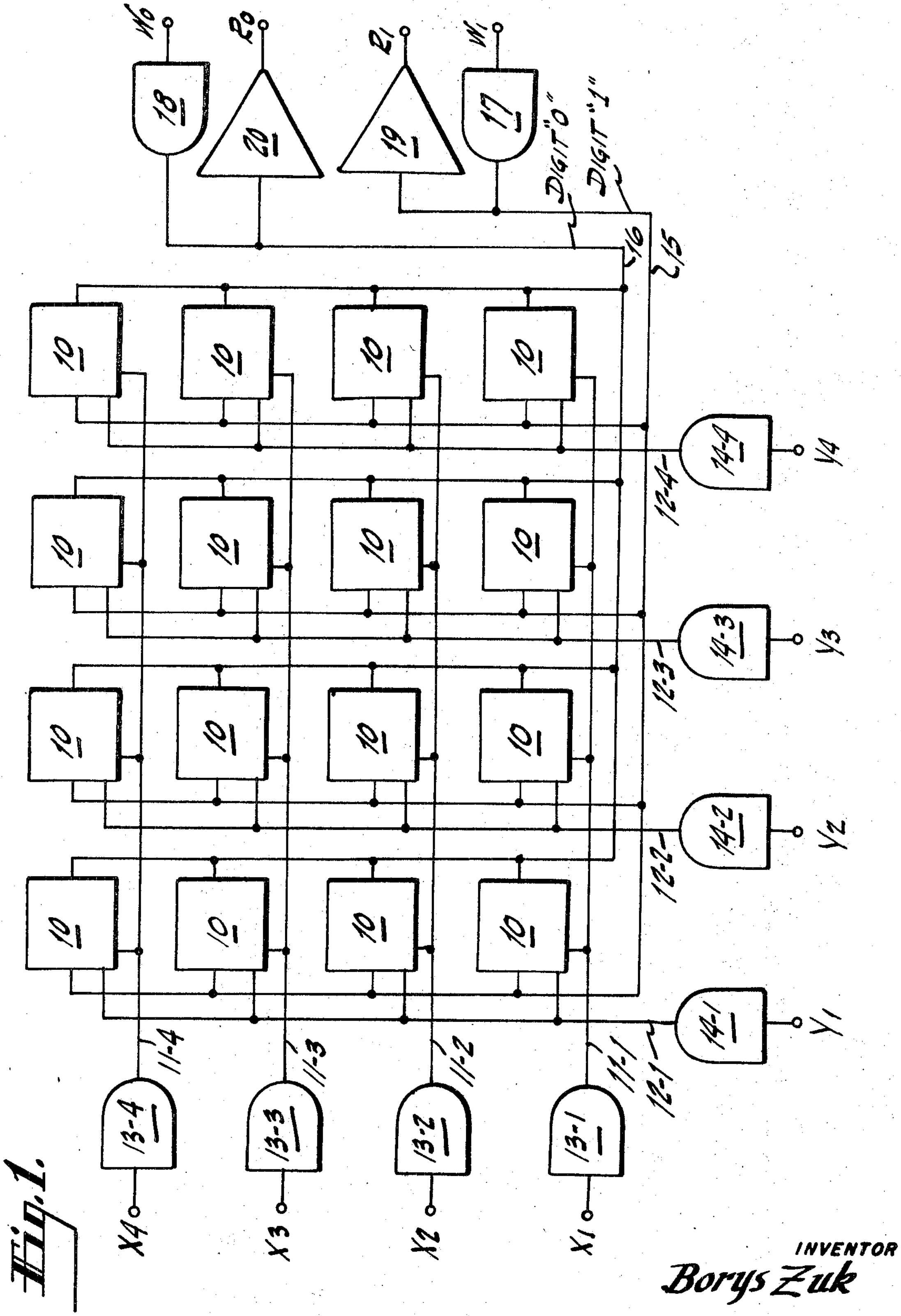
FIG. 1 is a block diagram of an exemplary memory organization with which the present invention may be employed.

Referring first to FIG. 1, there is shown an exemplary memory organization for the binary memory elements and associated read and write circuits of the present invention. The memory includes a plurality of binary memory elements or cells 10 arranged in a coordinate array of four rows and four columns to form a memory matrix. The four-by-four coordinate array is by way of example. The number of rows and columns of memory elements is expandable or retractable; and the number of rows does not necessarily have to be equal the number of columns.

A particular memory element 10 is selected for a READ or a WRITE operation by a coincident selection of an X-select line (row line) and a Y-select line (column line). To this end, the cells in each row are connected to an X-select line and the cells in each column are connected to a Y-select line. Thus, the X-select lines 11–1, 11–2, 11–3 and 11–4 are connected to the cells in their corresponding rows as illustrated. Similarly, the Y-select lines 12–1, 12–2, 12–3 and 12–4 are connected to the cells in their corresponding columns. Associated with the X-select lines 11–1, 11–2, 11–3 and 11–4 are X-select drivers 13–1, 13–2, 13–3 and 13–4, respectively. The X-select drivers 13–1, 13–2, 13–3 and 13–4 are adapted to receive X-select signals X1, X2, X3 and X4, respectively. Similarly, Y-select drivers 14–1, 14–2, 14–3 and 14–4 are adapted to receive Y-select signals Y1, Y2, Y3 and Y4 to drive the Y-select lines 12–1, 12–2, 12–3 and 12–4, respectively.

A DIGIT "1" line 15 and a DIGIT "0" line 16 are associated with each cell 10 in the array. The DIGIT "1" line 15 is connected to a WRITE driver 17, while DIGIT "0" line 16 is connected to a WRITE driver 18. The WRITE drivers 17 and 18 are adapted to selectively receive write command signals W0 and W1, respectively, during the write portion of the memory cycle to write information into a selected cell 10.

The DIGIT "1" line 15 is also connected to a sense amplifier 19; while the DIGIT "0" line 16 is further connected to a sense amplifier 20. The sense amplifiers 19 and 20 are operative during the read portion of the memory cycle to non-destructively read out or sense the state of a selected cell 10 and to provide R1 and R0 output signals, respectively.

MEMORY CELL AND READ-WRITE CIRCUITS

Figure 2:
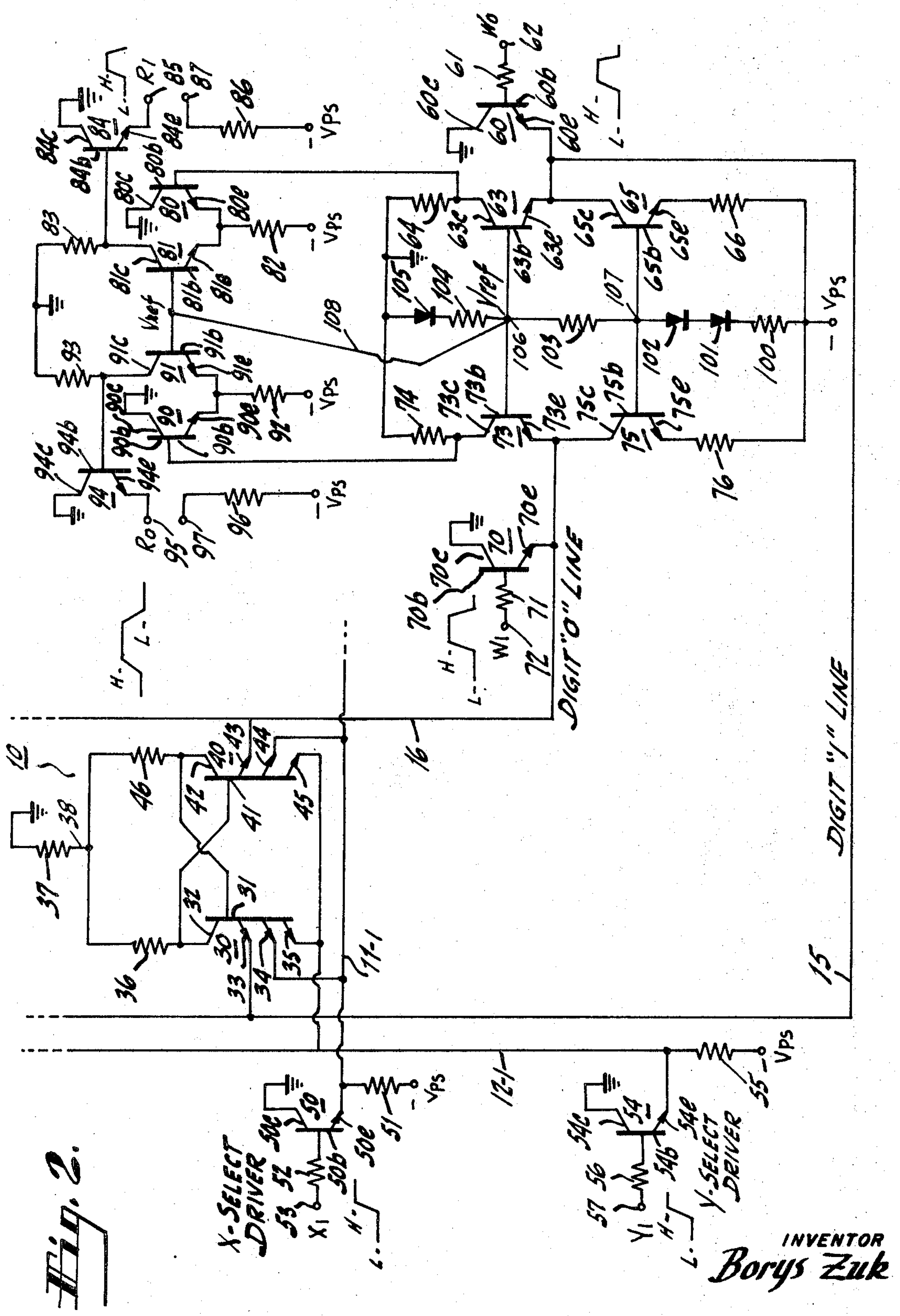
FIG. 2 is a circuit diagram of one of the binary memory cells of FIG. 1 together with associated read and write (R-W) circuitry.

Referring now to FIG. 2, there is shown a schematic circuit diagram of one of the binary memory elements 10 of FIG. 1 and associated read and write circuits. The memory element illustrated in FIG. 2 corresponds to the memory element 10 located in the first row and first column (lower left hand corner) of the coordinate array of FIG. 1. The memory element 10 includes a pair of multiple emitter transistors 30 and 40. Transistors 30 and 40 are cross-coupled to form a flip-flop (bistable multivibrator) by means of the connection between the collector electrode 42 and the base electrode 31 and the connection between the collector electrode 32 and the base electrode 41. Load or collector resistors 36 and 46 are also connected to the collector electrodes 32 and 42, respectively.

One of the emitter electrodes 33 of transistor 30 is connected to the DIGIT "1" line 15; while the emitter electrode 43 of transistor 40 is connected to the DIGIT "0" line 16. The emitter electrodes 34 and 44 are connected to the X-select line 11–1; while the other emitter electrodes 35 and 45 are connected to the Y-select line 12–1. It should be noted at this point that the DIGIT "1" and DIGIT "0" lines are similarly connected to each of the memory elements in the array and that the X-select line 11–1 and Y-select line 12–1 are similarly connected to the other memory elements in the same row and same column, respectively. Memory elements located in other columns and rows are similarly connected to their corresponding X-select and Y-select lines.

In accordance with one aspect of the invention, the collector supply paths for transistors 30 and 40 share a common resistor 37. That is, the resistors 36 and 46 are connected together at a circuit point 38 and by way of common resistor 37 to a point of fixed reference potential, illustrated as circuit ground by the conventional symbol. The resistor 37 cooperates with the flip-flop to provide a nonsaturating operation as described hereinafter.

The X-select line 11–1 is connected to the emitter electrode **50*e* of an emitter follower (common collector) transistor 50. Emitter resistor 51 is connected between the emitter electrode 50*e*** and the negative terminal of a power source designated $V_{PS}$, the other terminal (not shown) of which is connected to ground. The negative terminal is indicated in FIG. 2 by the minus symbol (−) adjacent the $V_{PS}$ terminal. The power source $V_{PS}$ may be any suitable source of D.C. voltage, such as a battery or a rectified A.C. supply.

The collector electrode **50*c* is connected to circuit ground. The base electrode 50*b* is connected by way of a base resistor 52 to input terminal 53. Input terminal 53 is adapted to receive the X-select signal X1. The X-select signal X1 may be derived from circuits remote from terminal 53 (or, for the case of an LSI chip, by external circuits) whereby the inductance of the line connection to terminal 53 may cause oscillation in the emitter follower 50. Base resistor 52** is given a suitable value to damp these oscillations.

The Y-select line 12–1 is connected to the emitter electrode **54*e* of another emitter follower transistor 54. Emitter resistor 55 is connected between the emitter electrode 54*e* and the negative terminal of the power source $V_{PS}$. The collector electrode 54*c* is connected to circuit ground; and the base electrode 54*b* is connected via base damping resistor 56 to an input terminal 57. The Y-select signal Y1 is applied to the input terminal 57. The emitter follower transistors 50 and 54 correspond to the X and Y-select drivers 13–1 and 14–1**, respectively, in FIG. 1.

The read and write (R-W) circuits for the memory cell form a pair of current mode transistor configurations with the memory element transistors 30 and 40. The current mode configuration (R-W "1") for the memory transistor 30 includes the DIGIT "1" line, the WRITE transistor 60, the READ (SENSE) transistor 63 and a current determining element, illustrated as transistor 65. The current mode configuration (R-W "0") for the memory transistor 40 includes the DIGIT "0" line, the WRITE transistor 70, the READ transistor 73 and the current determining transistor 75.

The (R-W "1") circuitry is similar to the (R-W "0") circuitry and similar components are identified by reference numerals having the same units digits. The tens digits 6 and 8 are associated with the (R-W "1") circuitry and the tens digits 7 and 9 are associated with the (R-W "0") circuitry. Due to the similarity of the (R-W "1" and (R-W "0") circuits, only the (R-W "1") circuitry will be described in detail.

For the (R-W "1") circuitry, the current determining transistor 65 has its emitter electrode **65*e* connected via emitter resistor 66 to the power source $V_{PS}$, and has its collector electrode 65*c* connected in common to the emitter electrodes 60*e* and 63*e* of the WRITE and READ transistors 60 and 63, respectively, and to the emitter electrode 33 of memory cell transistor 30** via the DIGIT "1" line.

The WRITE transistor 60 has its collector electrode **60*c* connected to circuit ground and its base electrode 60*b* connected via a damping resistor 61 to an input terminal 62. The input terminal 62 is adapted to receive WRITE "0" signals W0 during the WRITE portion of the memory cycle. The READ transistor 63 has its collector electrode 63*c* connected via a load or collector resistor 64 to circuit ground and has its base electrode 63*b*** connected to receive a reference voltage $V_{ref}$.

The reference voltage $V_{ref}$ is derived from a reference circuit which is common to both the (R-W "1") and the (R-W "0") circuits. The reference circuit includes a resistor 100, diodes 101 and 102, resistors 103 and 104 and a diode 105 serially connected in the named order between the power source $V_{PS}$ and circuit ground. The reference voltage $V_{ref}$ is derived from the connection point 106 between resistors 103 and 104. The base electrodes **65*b* and 75*b* of the current source transistors are connected to the connection point 107 between resistor 103 and diode 102. Diodes 101 and 102 and resistor 100 cooperate with resistors 66 and 76 to provide temperature compensation and power supply tracking for the current source transistors 65 and 75**.

The collector electrode **63*c* of the READ "1" transistor 63 is further connected to a stage having transistors 80, 81 and 84 connected in a current mode switch configuration with a WIRED OR (phantom OR) output capability. To this end, collector electrode 63*c* is connected to the base electrode 80*b* of transistor 80. The collector electrode 80*c* is connected to circuit ground. The emitter electrodes 80*e* and 81*e* are connected together and by way of emitter resistor 82 to the power source $V_{PS}$. The base electrode 81*b* is connected to receive the reference voltage $V_{ref}$ by way of connector 108. The collector electrode 81*c* is connected via collector resistor 83** to circuit ground.

Collector electrode 81*c* is further connected to the base electrode 84*b* of output emitter follower transistor 84. The collector electrode 84*c* is connected to circuit ground and the emitter electrode 84*e* is connected to an output terminal 85 to provide READ "1" output signals R1. An emitter resistor 86 is provided for transistor 84. Resistor 86 has one terminal connected to the power source $V_{PS}$ and another unconnected terminal 87. The unconnected terminal 87 is adapted for connection to terminal 85 to form an emitter resistor for transistor 84 only, or to form a common emitter resistor for several emitter follower transistors for phantom OR applications.

MEMORY CELL AND READ-WRITE CIRCUIT OPERATION

In the description which follows, a system design is selected in which the memory may be required to cooperate with commercially available current mode logic integrated circuits, such as, for example, the ECCSL (emitter coupled current steering logic) CD2150, CD 2151, CD 2152, RCA integrated circuit types, described in RCA Integrated Circuits Application Note, ICAN–5025, published in 1965 by RCA Electronics Components and Devices, Harrison, N.J.

The X1 and Y1 select signals and the W0 and W1 write signals may be derived from ECCSL circuits; while the R0 and R1 read signals may drive ECCSL circuits. Typical signals having a low (L) level and a high (H) level are shown in FIG. 2 adjacent the X1 and Y1 select signals, the W0 and W1 write signals and the R0 and R1 read signals. In the description which follows, the L and H levels are assumed to be —1600 millivolts and —800 millivolts, respectively, for a net signal swing of 800 millivolts. The power source voltage $V_{PS}$ is selected as $V_{PS}=5.0$ volts. In addition, the base-emitter junction voltage drop ($V_{BE}$) is considered to be 800 millivolts for all transistors.

The operation of the memory cell and (R-W) circuits can conveniently be described in terms of biasing of a non-selected cell, writing information into the cell and reading information from the cell.

NON-SELECTED MEMORY CELL BIAS CONDITION

For the case of a non-selected memory cell, all of the X1, Y1, W0 and W1 signals are at the lower level of —1600 millivolts. The emitter follower transistors 50 and 54 are turned on and translate with level shift (one $V_{BE}$ or 800 millivolts) the X1 and Y1 select signals to the X1 and Y1 select line 11–1 and 12–1, respectively, whereby the voltages on the lines are identical and equal to —2400 millivolts.

For the (R-W) circuits, the resistors 100, 103 and 104 are given values such that the reference voltage $V_{ref}$ has a value intermediate the L and H signal levels, and preferably midway therebetween. Hence, for the assumed system design, $V_{ref}=-1200$ millivolts. With both the W0 and W1 write signals at the lower level of —1600 millivolts, the transistors 60 and 70 are turned off and the transistors 63 and 73 are turned on. Substantially all of the current of current source transistor 75 is routed through collector resistor 74 via the collector to emitter path of transistor 73. Similarly, substantially all of the current of the current source transistor 65 is routed through the collector resistor 64 via transistor 63. Consequently, the DIGIT "0" line and the DIGIT "1" line are clamped via the base emitter junctions of transistors 73 and 63, respectively, to a voltage of —2000 millivolts.

Since the select lines 11–1 and 12–1 are biased to a lower voltage level, i.e. —2400 millivolts as compared to —2000 millivolts for the DIGIT 0 and DIGIT 1 lines, the the X1 and Y1 select lines provide drive currents for the memory cell 10. Consequently, there is no appreciable current flow in the DIGIT 0 and DIGIT 1 lines.

To describe the memory cell bias conditions, consider first the cell state in which transistor 30 is turned on and transistor 40 is turned off. Current in the conventional sense flows from circuit ground through resistor 37, resistor 36, collector electrode 32, both emitter electrodes 34 and 35, the associated emitter resistors 51 and 55, respectively, and the voltage source $-V_{PS}$. The current flow through resistors 36 and 37 establishes by voltage divider action a bias voltage at the circuit point 38. The base current of resistor 30 is relatively small (on the order of microamperes) such that there is negligible voltage drop across resistor 46, whereby the circuit point 38 and the base electrode 31 of transistor 30 are at substantially the same voltage. This voltage is 800 milliamperes (one $V_{BE}$ above the X1 and Y1 select lines or at a voltage of —1600 millivolts). The resistor 46, however, does provide a feedback function for the turned on transistor 30.

The values of resistors 36 and 37 and 46 are selected so that the conduction of transistor 30 is stabilized to the extent that it avoids saturation. According to one circuit design, the resistor values are selected such that there is only a 400 millivolts voltage drop across the resistor 36. The collector voltage for transistor 30 then is —2000 millivolts whereby the net forward bias for the collector-base junction of transistor 30 is 400 millivolts. Since a silicon type transistor does not saturate until the collector-base junction has a net forward bias of about 700 to 800 millivolts, the conduction of transistor 30 is stabilized to a point just short of saturation.

Similar considerations apply for the other memory cell state in which transistor 40 is turned on and transistor 30 is turned off. For this state of the memory cell, the voltage drop across resistor 37 is fed back via resistor 36 to stabilize transistor 40 to a non-saturated conductive state.

It should be noted at this point that for the case of partial select (i.e., either an X line or a Y line, but not both, is HI) the memory cells associated with the selected line remain latched to their corresponding non-selected lines which are at a lower voltage. For example, if the Y1 line is selected (raised to a voltage of —1600 millivolts) and all of the X lines remain at the non-selected voltage level of —2400 millivolts, each of the memory cells 10 associated with the Y1 select line remain latched to their corresponding X select lines. Consequently, partially selected cells remain disconnected from the (R-W) circuits so that there can be no write-in or read-out of partially selected memory cells.

This aspect of the invention provides a non-saturating flip-flop memory cell which is especially advantageous for high speed applications, such as scratch pad memories.

READ OUT OF A MEMORY CELL

As explained previously, information is read out of a memory cell by a coincident selection of an X select line (row line) and a Y select line (column line). For selection of the memory cell illustrated in FIG. 2 the X1 and Y1 signals are concurrently changed from the L level of —1600 millivolts to the H level of —800 millivolts. These changes in signal condition are translated with level shift by the emitter follower transistors 50 and 54 whereby the voltage levels on the X1 and Y1 select line 11–1 and 12–1, respectively, increase from —2400 millivolts to —1600 millivolts. The DIGIT "0" and "1" lines are now at lower voltage levels (—2000 millivolts) than the X1 and Y1 select lines (—1600 millivolts) whereby the memory cell current now flows in either the DIGIT 0 or the DIGIT 1 line acocrding to the state of the memory cell. For the cell state where transistor 30 is turned on, current flows from the emitter electrode 33, the DIGIT 1 line and the current source transistor 65. This current flow in the DIGIT 1 is sensed by the read or sense amplifier circuitry in the following manner.

The collector current of current source transistor 65 is substantially constant whereby the current flow in the DIGIT "1" line causes a decrease in the emitter current of the turned-on transistor 63 and a corresponding decrease in collector current for transistor 63. This results in a smaller voltage drop across collector resistor 64 to provide a read or sense signal indicative of a binary "1" state for the memory cell. The sense signal is further gated by the current mode switch transistor pair 80 and 81 and the emitter follower transistor 84 to appear as the R1 signal at the terminal 85.

For the other memory cell state where transistor 40 is turned on and transistor 30 is turned off, current flows in the DIGIT "0" line when the memory cell is selected. The current flow in the DIGIT "0" line is sensed by the transistor 73 in a manner similar to the way transistor 63 sensed the current in the DIGIT "1" line for the other state of the memory cell. The signal appearing across collector resistor 74 is indicative of the binary "0" state of the memory cell. This sense signal is then amplified by the current mode transistor pair 90 and 91 and the emitter follower transistor 94 to appear as an R0 read-out signal at terminal 95.

WRITING INTO A MEMORY CELL

As explained previously, information is written into a memory cell by a coincident selection of an X and a Y select line and a simultaneous selection of either the DIGIT "0" or the DIGIT "1" line. For the memory cell illustrated in FIG. 2, the X1 and Y1 select lines are selected as in the read-out operation whereby the voltage levels on these lines are increased from the lower level of −2400 millivolts to a higher level of −1600 millivolts. To write a binary "1" into the memory cell the write transistor 70 is selected by changing the W1 signal from the L level of −1600 millivolts to the H level of −800 millivolts. The transistor 70 turns on and the transistor 73 turns off, whereby the voltage level of the DIGIT "0" line increases from −2000 millivolts to −1600 millivolts. The DIGIT "1" line remains at the lower voltage of −2000 millivolts and therefore the cell 10 is forced to assume the binary "1" state in which the transistor 30 is turned on and transistor 40 is turned off. After a time sufficient to allow switching of the memory cell, the W1 signal is returned to the L level of −1600 millivolts. Writing a binary "0" into the memory cell is accomplished in a similar manner by applying a W0 pulse signal to the write transducer 60.

A significant feature of the invention is that the state of the memory cell can be checked as the information is being written into the cell. For example, when a binary "1" is being written into the cell, current flows only in the DIGIT "1" line. This current flow is sensed by the sense transistor 63 and amplified by current mode amplifier transistors 80 and 81 and emitter follower transistor 84 to provide an R1 signal concurrently with the writing of the binary "1." In addition, a W1 write signal causes transistor 70 to turn on and transistor 73 to turn off. The collector voltage of transistor 73 rises and causes the current mode amplifier transistors 90 and 91 and the emitter follower transistor 94 to provide an R0 signal. Similar considerations apply for the writing of a binary "0" whereby both the R0 and R1 signals are at the H level of −800 millivolts when either a "1" or "0" is being written into the cell. Either the R1 or the R0 signal or any combination thereof can be used in conjunction with other circuitry to provide an error check. For example, the R0 and R1 signals may be employed as inputs to a coincidence gate, such as an AND gate, to provide an output only when both the R0 and R1 signals are at the H level.

What is claimed is:

1. In combination with an array of storage cells, each cell comprising a pair of cross-coupled multi-emitter bipolar transistors, an improved read-out and write-in amplifier associated with at least one of said multi-emitter transistors comprising:

first and second transistors, each having base, collector, and emitter electrodes;

a current determining element;

means directly connecting the current determining element to the emitter electrodes of said first and second transistors as well as to one of the emitter electrodes of said pair of multi-emitter bipolar transistors;

means coupling the collector electrodes of the first transistor to a load;

means coupling the base electrode of one of said first and second transistors to a first reference voltage deriving circuit; and means adapted to selectively apply input signals to the base electrode of the other one of said first and second transistors.

2. The combination as claimed in claim 1 wherein each transistor of each cell has a collector electrode, and further including, at each cell of the array, three load resistors, each resistor having two terminals, one resistor connected at one terminal to the collector electrode of one transistor of the pair, the second resistor connected at one terminal to the collector electrode of the other transistor of a pair, and the third resistor connected at one terminal to a point of reference potential and at the other terimnal to the other terminal of the first and second resistors.

3. The invention according to claim 1:

wherein said storage cells are arranged in rows and columns, and further including first select means including a select driver for each row and second select means including a select driver for each column;

wherein a particular cell is selected by the concurrent selection of both a row and a column driver; and wherein the state of a selected cell is established in accordance with said input signals.

4. In combination with first and second transistors cross-coupled to form a flip-flop, each transistor having at least three emitter electrodes, a first select means coupled to the first emitter electrode of each transistor, and a second select means coupled to the second emitter electrode of each transistor, the improvement comprising two current mode amplifier circuits for sensing the state of the flip-flop, one such circuit connected to the third emitter electrode of one transistor and the other such circuit connected to the third emitter electrode of the second transistor, each amplifier circuit comprising:

a transistor device having base, collector, and emitter electrodes;

a current source directly connected to the emitter electrode of the transistor device as well as to one of said third emitter electrode;

means coupling the base electrode of the transistor device to a reference voltage deriving circuit; and means coupling the collector electrode of the transistor device to a load.

5. The invention according to claim 4:

wherein each of said current mode amplifier circuits further includes a fourth transistor having a base, collector and emitter electrode, means coupling the emitter electrode of the fourth transistor to the current determining element, and means adapted to selectively apply input signals across the base and collector electrodes of the fourth transistor.

6. The invention according to claim 5:

wherein said flip-flop is one of a plurality of like flip-flops arranged in rows and columns, wherein the first select means includes a select driver for each row and the second select means includes a select driver for each column, wherein a particular flip-flop is selected by the concurrent selection of both a row and a column driver, and wherein the state of a selected flip-flop is established in accordance with said input signals.

References Cited

UNITED STATES PATENTS

| | | | |
|---|---|---|---|
| 3,226,574 | 12/1965 | Winkler | 307—292 XR |
| 3,423,737 | 1/1969 | Harper | 307—291 XR |
| 3,436,738 | 4/1969 | Martin | 307—238 XR |
| 3,193,702 | 7/1965 | Claessen | 328—206 XR |

DONALD J. YUSKO, Primary Examiner

U.S. Cl. X.R.

307—292; 328—206; 340—173